United States Patent

[11] 3,567,051

| [72] | Inventor | Irvine Allan Bell<br>Empangeni, Zululand, Natal Province, South Africa |
|---|---|---|
| [21] | Appl. No. | 784,409 |
| [22] | Filed | Dec. 17, 1968 |
| [45] | Patented | Mar. 2, 1971 |
| [73] | Assignee | I. A. Bell and Company (Proprietary) Limited<br>Natal Province, South Africa |
| [32] | Priority | Dec. 18, 1967 |
| [33] | | South Africa |
| [31] | | 67/7,587 |

[54] GREATLY MANEUVERABLE SELF-PROPELLED MACHINE
7 Claims, 4 Drawing Figs.

[52] U.S. Cl. .................................................. 214/147, 180/6.48
[51] Int. Cl. .................................................. B62d 11/04
[50] Field of Search ........................................... 214/147, 147 (G), 80, 1 (B)4; 180/6.48, 6.5

[56] References Cited

UNITED STATES PATENTS

| 3,208,609 | 9/1965 | Davis ........................... | 180/6.48X |
| 3,434,557 | 3/1969 | Paramythioti ................ | 180/6.48 |

FOREIGN PATENTS

| 35,884 | 3/1954 | Poland ........................ | 180/6.48 |

Primary Examiner—Gerald M. Forlenza
Assistant Examiner—George F. Abraham
Attorney—Karl W. Flocks ABSTRACT: The invention relates to a self-propelled machine of exceptional maneuverability and having power-operated tool equipment and wherein the controls for controlling the machine movements are operated by the feet and the operations of the tool equipment controlled by the hands of the operator.

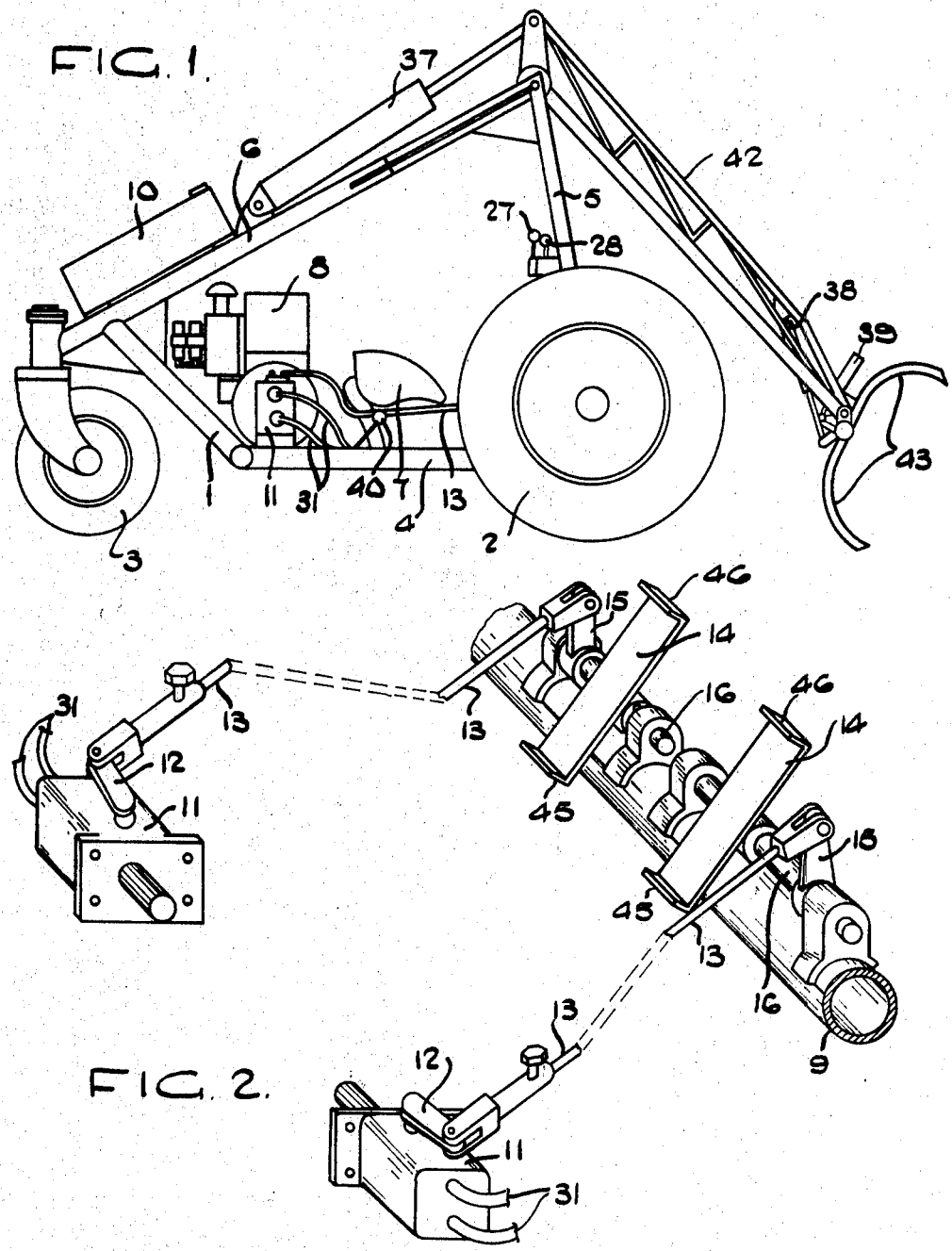

GREATLY MANEUVERABLE SELF-PROPELLED MACHINE

This invention relates to a self-propelled machine of exceptional maneuverability More particularly the invention relates to a highly maneuverable self-propelled machine having power operated tools and equipment to render it particularly suitable for various agricultural, industrial and like purposes such as for harvesting, material handling, loading and like operations.

According to the invention a self propelled machine, having at least one pair of spaced driving wheels, each driven separately by a reversible hydraulic motor, and hydraulically powered tools and like equipment, includes manually operated controls of which the controls for controlling the movements of the machine are operated by the feet of an operator whereas the operation of the controls for the tools and equipment is controlled by the hands of the operator.

The position for the operator is advantageously within the chassis and a superstructure frame work, and towards the front of the machine.

More particularly, the steering and direction of movement of the machine is controlled the feet of the operator acting on pedal devices in two opposite directions relative to a central neutral position of each pedal. The pedal means towards one side is adapted to control the speed and direction of driving rotation of the hydraulic motor on that side of the machine while the pedal means towards the other side of the machine is adapted to control the speed and direction of driving rotation of the hydraulic motor on said opposite side of the machine.

The self-propelled machine preferably provides a chassis composed of a front transverse member, having a wheel on each end while each wheel is driven by a separate hydraulic motor attached to an end of the transverse member, and a longitudinal structure extending rearwardly from the transverse member and having the rear end supported on a freely swivelable castor-type wheel. Towards the rear of the chassis a pair of variable delivery hydraulic pumps are mounted and which are driven by an internal combustion engine. The engine, which runs at a constant speed, is preferably mounted transversely across the chassis while the pumps are advantageously driven directly off each end of the engine crankshaft and at the constant engine speed. The output of both pumps is variable and the flow reversible in accordance with the settings of the control means. Each pump is controlled independently of the other while each pump drives a wheel hydraulic motor independently of the other. An additional pump, of fixed delivery, is also provided and conveniently driven by a drive off an extension of the camshaft drive to supply hydraulic pressure to hydraulically powered tools or equipment mounted on the machine. The hydraulic tools or equipment may comprise a jib, lift, grab, angling, and such like means. In addition the said additional pump, or a further pump, may be provided for driving one or more rotatable tools or equipment members, such as cutting blades, saws, feeding devices, conveyors or the like.

Each one of the pair of independent transversely spaced pedals consist of an intermediately and transversely pivoted platelike element having a heel support flange. Each pedal forming plate, presenting a treadle, is fixed transversely on a horizontally disposed journaled shaft which in turn is provided with a crank arm from which a link forming rod extends rearwardly for connection to a control lever of a wheel hydraulic motor pump to vary the output of and the output flow direction from the pump. Said pump control means may be directly or servo operated. The link forming rods from the pedals to the control means are preferably adjustable.

The additional pump, for operation of the hydraulically operated tools and/or equipment, supplies hydraulic pressure through hand operated controls to such tools or equipment. A bypass pipe is taken off the return pipe of the additional pump circuit before a restricter in order to provide a boost pressure (of approximately 5 p.s.i.) required to feed the two closed hydraulic circuits connecting the variable delivery pumps of the wheel motors.

To obtain a clear understanding of the invention reference will now be made to the accompanying drawings.

In the drawings:

FIG. 1 is a side elevation of a self-propelled machine suitable for bundling and loading sugar cane or the like, and incorporating the means according to the invention;

FIG. 2 is an oblique view showing the foot control means for variable output pumps;

Figure 3:
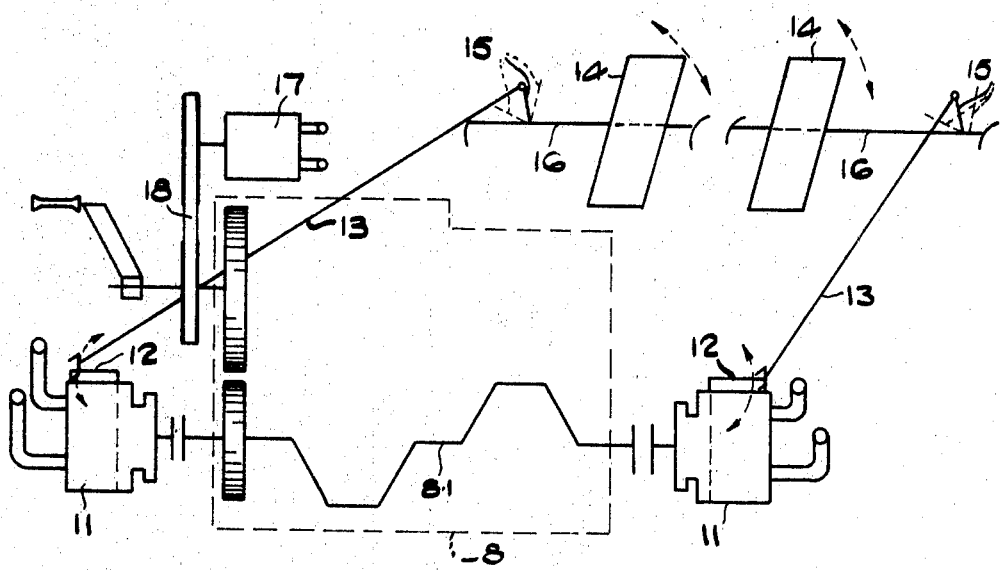
FIG. 3 is a diagrammatic outline of the foot control means for the variable output pumps.

The machine shown in FIG. 1 comprises a chassis frame 1 of which the front end is carried on a pair of laterally spaced traction wheels 2 whereas the rear end is carried on a freely swivelable castor-type wheel 3. Horizontal members 4 are provided with mountings for a diesel engine 8.

On the chassis frame 1 a superstructure is secured which is composed of a pair of slightly upwardly converging and slightly rearwardly leaning posts 5 and a forwardly and upwardly sloping upper member or "spine" 6 which is of substantially Y- or fishtailed-shape and of which the ends of the divergent portion are fixed to the top ends of the posts 5. Said ends of the posts are connected by a shaft.

Within the space formed by a chassis 1 and the superstructure a driver or operator seat 7 is mounted. The seat 7 is disposed in front of the engine 8 which is transversely mounted on the chassis. The seat 7 is at a spaced position from a front transverse chassis member 9. On the superstructure member 6 a fuel tank 10 is mounted.

The frame structure, comprising the chassis and the superstructure, is preferably constructed from hollow tubular members and is conveniently utilized as a supply container for hydraulic working fluid. Such container means is provided with filler fittings and filters.

Referring particularly to FIG. 3 and to FIG. 2 of the drawings reference numeral 8.1 denotes the crankshaft of the internal combustion engine 8 to each end of which a variable delivery hydraulic pump 11 is coupled. Each pump 11 is provided with a control lever arm 12 which is connected by a variable length link rod 13 to separate crank arms 15 of inline but unconnected shafts 16. On each shaft 16 a treadlelike pedal 14 is fixed. Each pedal 14 is engaged by a foot of an operator for forward or rearward movement from a central or neutral position. The said shafts 16 are conveniently journaled on the transverse front member 9 of the frame chassis 1 of the machine.

A fixed delivery pump 17 is driven by a V-belt drive 18 off an extension of the crankshaft of the engine 8.

Figure 4:
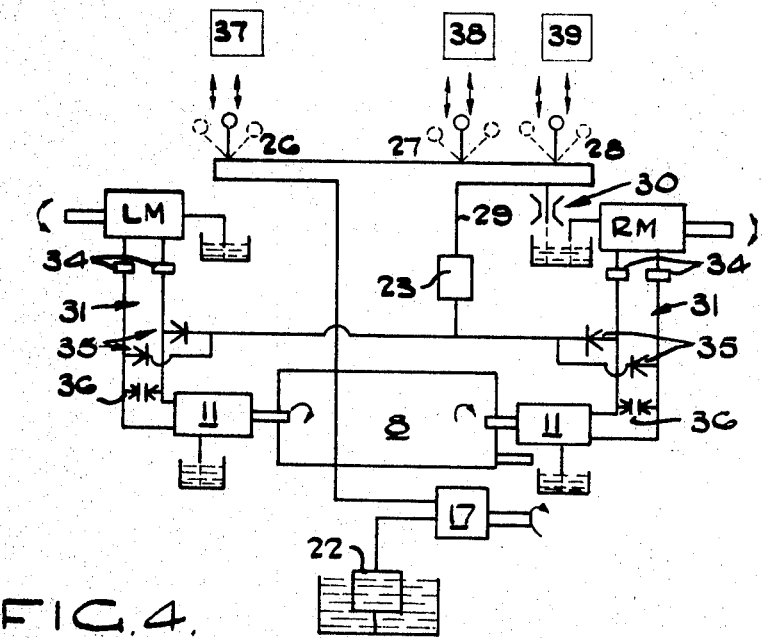
FIG. 4 is a diagrammatic representation of the hydraulic circuits for the machine shown in FIG. 1.

Referring to FIG. 4 each variable delivery hydraulic pump 11, driven by the engine 8, has a variable output and a reversible flow according to the settings of the pump control levers 12. The additional pump 17, of fixed delivery, supplied hydraulic pressure to the controls 26, 27 and 28 to the cylinder units 37, 38 and 39 of tools or equipment of the machine while a bypass pipe 29 is taken off the return pipe before a restricter 30 to provide a boost pressure required to feed two closed hydraulic circuits 31 connecting the variable delivery pumps 11 to the respective wheel motor LM and RM. The closed circuit pipes 31 contain magnetic plugs 34 to trap magnetic metal particles in he fluid while four check valves 35 are used to replace hydraulic fluid escaping in the two closed circuits 31. The closed circuits 31 each has a two-way pressure release valve 36 connected across the pipes.

The hand controls 26, 27 and 28 are mounted at readily excessable positions for the operator on the posts 5.

In the working fluid supply container, e.g. the hollow frame structure members, filters 22, 23 are provided.

The throttle control 40 is conveniently positioned next to the operator's seat.

In FIG. 1 the jib 42 is provided with pairs of grab arms 43 which are opened and closed by the extension and contraction of cylinder units 39 while angling of the grab arms may be effected by the cylinder unit 38. The operation of cylinder units 39 and the unit 38 is effected by hand controls 28 and 27 respectively.

Longitudinally on the super structure member 6 the hydraulic pressure cylinder unit 37 for control of the jib 42 is mounted and connected thereto by a transverse pivot. The jib 42 controlled by the unit 37, is pivotally mounted on a transverse shaftlike member forming the top front of the superstructure.

The hydraulic wheel-driving motors LM and RM are attached to mounting plates on the ends of member 9.

The machine is controlled in respect of all its traveling motions by the feet of the operator. Such traveling movements are at speeds from zero to maximum and maximum torque at zero revolutions for rotating about a point on the ground to turns of any radius in any direction, in forward or reverse, stopping, starting or inching movements in either direction or turns with full engine power applied to both or either driving wheel.

The braking is controlled by the engine when in motion. Sudden stops is obtained by merely reversing and centralizing the pedals, whereas gradual stops is obtained by lower pedal movements. In the central position of the pedals the pistons in the respective variable delivery pumps remain stationary in regard to the pumping strokes while, as the pedal is removed from the central or neutral position in either direction, so the working stroke of the piston commences and the fluid under pressure begins to flow while further movement of the pedals progressively increases the amount of fluid delivery by the pistons to thereby effect a corresponding increase in the wheel motor speeds.

The machine according to the invention requires no clutches, steering mechanism, torque converters, differential lock mechanisms, final drive gearing and universal couplings. When employing a hand start air-cooled diesel engine or the like, radiators, cooling systems and electrically starting gear is eliminated.

With the foot pedals 14 in the central or neutral positions the wheels 2 cannot move. If desired, safety lock means may be provided with the controls of the variable output pumps for locking of the pumps in the ineffective positions. However separate manually controlled hydraulic conduit short circuiting valves in each closed circuit may be provided to allow free rotation of the wheel motors whereby towing of the machine may take place.

Straight forward movement of the machine is effected by equal movement of both pedals 14 in a forward direction. Reverse movements is obtained by pressing the foot control pedals 14 downwardly. A turn to the right is made by a greater pressure on the left side pedal and reduction of pressure on the right pedal while the reverse is effected for a left turn. A 360° turn to the right requires a full forward movement of the left-hand pedal and a full rearward or downward movement of the right hand pedal.

The pedals 14 are provided with a heel flange 45 and toe flange 46 to prevent slipping off of the operator's feet from the pedals.

The invention is not limited to the provision of the jib 42 and grab means 43. Other equipment and/or tool means may be provided in addition or instead of the jib and, or, the grab means.

I claim:

1. A self-propelled machine including a chassis with hand operated hydraulically powered tools and like equipment mounted thereon and having a front transverse member with a wheel on each end, a reversible hydraulic motor attached to each end of the transverse member for driving one wheel independently of the other, a longitudinal structure part of the chassis extending rearwardly from the transverse member and having a rear end portion thereof supported on a freely swivelable castor-type wheel, a pair of variable delivery reversible hydraulic pumps driven by an internal combustion engine mounted towards the rear of the longitudinal structure part and run at a constant speed, a seat for the operator forwardly of the engine and within the longitudinal structure and a superstructure frame work, and a pair of spaced pedals separately pivotally mounted for independent movement relative to one another in opposite directions relative to central neutral positions; the output of both pumps being variable and the flow reversible in accordance with settings of the pair of control pedals operated by the feet of an operator while the pumps are run at substantially the same constant speed of the engine, each pump being controlled independently of the other for independent driving of a hydraulic wheel motor whereas a control arm of each pump is connected to a part movable in unison with a pedal mounted towards the front of the machine, the pedal towards one side of the machine controls the speed and direction of driving rotation of the hydraulic motor on the same side of the machine whereas the pedal towards the opposite side of the machine controls the speed and direction of driving rotation of the hydraulic motor on said opposite side of the machine.

2. A self-propelled machine as claimed in claim 1 wherein an additional pump of fixed delivery is provided and driven by the engine and supplying hydraulic pressure working fluid to the hydraulically powered tools and like equipment, the hydraulically powered tools and like equipment being disposed at the front of the machine and controlled by hand operated control members within easy reach of the hands of the operator.

3. A self-propelled machine as claimed in claim 2 wherein the superstructure provides mountings for the tools and like equipment of the machine and includes on the front of the machine upwardly extending postlike members onto which the control members for the tools and like equipment are mounted whereas the pedals, connected to the controls of the wheel motor driving pumps, are mounted on the front transverse member by separate shafts having crank arms, the crank arm of each shaft being connected by a link to a control arm of one of the wheel motor driving pumps.

4. A self-propelled machine as claimed in claim 1 wherein the pair of independent pedals each comprises an intermediately and transversely pivoted platelike member having flangelike protrusions on the opposite ends, each pedal forming platelike member presenting a treadle which is fixed onto a horizontally disposed and journaled shaft which in turn is provided with a crank arm from which a link forming rod of adjustable effective length extends rearwardly for connection to a control arm of a wheel driving hydraulic motor pump to vary the output of and the output flow direction of the pump.

5. A self-propelled machine as claimed in claim 2 wherein the additional pump for operating the hydraulically operated tools and like equipment supplies hydraulic pressure through the hand operated controls to the tools and like equipment, a bypass pipe being taken off a return pipe of a circuit including the additional pump and before a restricter to provide a boost pressure to feed two closed hydraulic circuits connecting the variable delivery pumps to the hydraulic wheel motors.

6. A self-propelled machine as claimed in claim 1 wherein pipes of closed hydraulic circuits connecting the variable delivery pumps to the wheel motors are provided with magnetic plugs for trapping metallic particles, check valves to replace fluid escaping in the closed circuits, and two-way pressure release valves connected across the the pipes of the two closed circuits for safeguarding the system against excess pressures.

7. A self-propelled machine as claimed in claim 1 wherein a hydraulic pressure cylinder unit is mounted longitudinally on a longitudinally arranged member of the superstructure and connected to a jib of a crane device pivotally mounted on a transverse shaftlike member forming the front of the superstructure, said cylinder being connected to an additional pump of fixed delivery driven by the engine and supplying hydraulic pressure working fluid to said cylinder.